(12) United States Patent
Festeau et al.

(10) Patent No.: US 7,220,083 B2
(45) Date of Patent: May 22, 2007

(54) CUTTING INSERT FOR HIGH FEED FACE MILLING

(75) Inventors: Gilles Festeau, Franklin, TN (US);
Jean-Luc Dufour, Franklin, TN (US);
X. Daniel Fang, Franklin, TN (US);
David J. Wills, Brentwood, TN (US)

(73) Assignee: TDY Industries, Inc., Pittsburgh, PA (US)

( * ) Notice: Subject to any disclaimer, the term of this patent is extended or adjusted under 35 U.S.C. 154(b) by 23 days.

(21) Appl. No.: 10/686,308

(22) Filed: Oct. 15, 2003

(65) Prior Publication Data

US 2005/0084342 A1 Apr. 21, 2005

(51) Int. Cl.
*B23B 27/16* (2006.01)
(52) U.S. Cl. ........................... 407/113; 407/35
(58) Field of Classification Search ............... 407/113, 407/114, 115, 35, 42, 48, 61, 62
See application file for complete search history.

(56) References Cited

U.S. PATENT DOCUMENTS

| | | | |
|---|---|---|---|
| 4,274,766 A * | 6/1981 | Raupp et al. ............... 407/15 |
| 4,294,565 A | 10/1981 | Erkfritz |
| 4,681,488 A * | 7/1987 | Markusson ............... 407/114 |
| 5,203,649 A * | 4/1993 | Katbi et al. ............... 407/114 |
| 5,246,315 A | 9/1993 | Hannsson et al. |
| 5,346,336 A | 9/1994 | Rescigno |
| 5,454,670 A | 10/1995 | Noda et al. |
| 5,634,745 A | 6/1997 | Wiman et al. |
| 5,658,100 A | 8/1997 | Deiss et al. |
| 5,762,453 A * | 6/1998 | Arai et al. ............... 407/113 |
| 5,951,212 A * | 9/1999 | Emoto et al. ............... 407/34 |
| 6,053,671 A | 4/2000 | Stedt et al. |
| 6,238,133 B1 | 5/2001 | DeRoche et al. |

(Continued)

FOREIGN PATENT DOCUMENTS

EP    1 157 768 A1    11/2001

(Continued)

OTHER PUBLICATIONS

U.S. Appl. No. 10/414,358, filed Apr. 15, 2003.

(Continued)

*Primary Examiner*—Willmon Fridie, Jr.
(74) *Attorney, Agent, or Firm*—Kirkpatrick & Lockhart Nicholson Graham LLP

(57) ABSTRACT

A cutting insert for milling operations, such as, face milling, slot milling, plunge milling, and ramping operations. The cutting insert exhibits a combination of favorable cutting edge strength, and unique cutting edge geometry, thus, allowing milling operations at relatively high feed rates. The cutting insert includes at least four cutting edges, wherein at least one of the cutting edges is a convex cutting edge. Certain embodiments of square cutting inserts will have four convex cutting edges which may be connected by nose corners. The convex cutting edge may comprise at least one of a circular arc, a portion of an ellipse, a portion of a parabola, a multi-segment spline curve, a straight line, or combinations of these. Wherein the convex cutting edge comprises a circular arc, the circular arc may have a radius greater than or equal to two times a radius of the largest circle that may be inscribed on the top surface.

19 Claims, 12 Drawing Sheets

U.S. PATENT DOCUMENTS 6,540,448 B2 * 4/2003 Johnson .................. 407/35
6,669,412 B1 * 12/2003 Hirose et al. .............. 407/113
6,769,844 B2 * 8/2004 Waggle .................... 407/114
2002/0098049 A1 7/2002 Satran et al.

FOREIGN PATENT DOCUMENTS

| JP | 8-174327 | 7/1996 |
|---|---|---|
| WO | WO 96/35538 | 11/1996 |
| WO | WO 02/18083 A2 | 3/2002 |

OTHER PUBLICATIONS

U.S. Appl. No. 10/440,740, filed May 19, 2003.

* cited by examiner

US 7,220,083 B2

CUTTING INSERT FOR HIGH FEED FACE MILLING

FIELD OF THE INVENTION

The present disclosure is directed to a cutting insert. The cutting insert exhibits a combination of favorable cutting edge strength, and unique cutting edge geometry, thus, allowing milling operations at relatively high feed rates and may be useful in face milling, slot milling, plunge milling, and ramping operations.

DESCRIPTION OF THE INVENTION BACKGROUND

Traditional machining methods, which are the principal means of removing metal from workpieces, include chip cutting (such as milling, drilling, turning, broaching, reaming, and tapping) and abrasive machining methods (such as sanding, grinding, and polishing). One such chip cutting process, face milling, may be useful to produce a generally flat surface on a workpiece. A face milling tool or "face mill" is so named because the flat workpiece surface is produced by action of the face of the tool, although the outside diameter or bevel cutting edge removes most of the stock. In a typical application, a milling cutter tool comprising a number of cutting inserts may be driven by a spindle on an axis positioned perpendicular to the surface being milled. ASM Handbook, Volume 16, "Machining" (ASM Intern. 1989) p. 311.

A milling cutter tool produces chips with variable chip thickness. Chip thickness may be used in calculating the maximum load per unit length exerted on the edges of a milling cutting tool. An average chip thickness is typically used in such calculations. Average chip thickness can be calculated and varies with cutting insert lead angle for the same material feed rate. For the example of a substantially square-shaped insert having four identical cutting edges, a larger lead angle produces a larger average chip thickness during machining, while a smaller lead angle produces chips of smaller average thickness. An example of the variation of average chip thickness with lead angle of the insert is shown in FIG. 1. FIG. 1 illustrates a comparison of an identical square-shaped insert machining with lead of angles of 90°, 75°, and 45°. As indicated in the FIG. 1, as the lead angle increases from 45° in FIG. 1(a), to 75° in FIG. 1(b), to 90° in FIG. 1(c), the average chip thickness ($h_m$) increases from 0.71 times the feed per tooth of the holder ("$f_z$"), to 0.97×($f_z$), to $f_z$. More generally, the chip thickness for a square-shaped cutting insert, or any other insert having a linear cutting edge used in a milling cutter tool, may be calculated using the equation $h_m = f_z \times \sin(K)$, where $h_m$ is the average chip thickness, and K is the lead angle measured in the manner shown in FIG. 1.

FIG. 1 also indicates that the length of engaged cutting edge when using a 90° lead angle is shortest among those scenarios shown in FIG. 1, while the length of engaged cutting edge is longest when the lead angle is 45°. This means that face milling using a 90° lead angle produces more load, i.e., higher stresses, on the cutting edge per unit length compared with milling using a 45° lead angle, for the same depth of cut. An advantage of reducing load on the cutting edge per unit length is that reduced load allows for employing a higher feed rate per tooth in the milling operation and improved tool life. Thus, to reduce the average load stresses on the engaged cutting edge, it is clearly an advantage to use a smaller lead angle.

Square-shaped cutting inserts are commonly used in face and plunge milling because they are strong, indexable and have multiple cutting edges. Inserts having a substantially square shape or otherwise including four cutting edges are disclosed in, for example, U.S. Pat. Nos. 5,951,212 and 5,454,670, U.S. Published Application No. US2002/0098049, Japanese reference No. 08174327, and PCT Publication No. WO96/35538. A common feature of the inserts disclosed in these references is the combination of four straight cutting edges and either a planar or a bevel planar clearance (or relief) surface below each cutting edge.

It is well-known that round-shape inserts, however, have the strongest cutting edge. In addition, round-shaped inserts provide a favorable combination of maximal corner strength, good material removal capacity, mechanical shock resistance, and thermal distribution. As such, round-shaped face milling inserts are often used for the more demanding machining applications, such as those involving difficult-to-cut materials, hard materials, heat resistant materials, titanium, etc. In face milling using a round-shaped cutting insert, the lead angle and the extent of the engaged cutting edge will vary with the depth of cut, as shown in FIG. 2. The average chip thickness produced by a round-shape insert can be approximately calculated by the following equation (I):

$$h_m = \frac{f_z}{R} \cdot \sqrt{R^2 - (R - doc)^2} \tag{I}$$

where $h_m$ is the average chip thickness, $f_z$ is the feed per tooth from a milling cutter, R is the radius of the round-shape cutting insert, and doc is the depth of cut. The above equation indicates that when cutting with a round-shaped insert, chip thickness varies with depth of cut. In contrast, when cutting using a square-shaped insert or any insert having a linear cutting edge, chip thickness does not change with changes in the depth of cut if the lead angle remains the same (see FIG. 1).

Furthermore, for the same depth of cut, a larger radius of a round-shaped insert always corresponds to a larger portion of the cutting edge engaging the work piece, as illustrated in FIG. 3, thus, reducing the average stress load per unit length on the cutting edge. This, in turn, allows the use of higher feed rates during face milling without a loss of quality. However, a limitation of a round-shaped cutting insert lies in that the larger the radius, the larger the insert. It is difficult to fully utilize the advantages provided by round-shaped inserts of increasingly larger radius in conventional machining applications due to their size.

Accordingly, to overcome the cutting edge load problems that may be encountered in face milling with large lead angles, there is a need for an improved design of cutting insert that allows for significantly increased feed rates during face milling operations while maintaining the same or longer tool life of the cutting inserts. Also, there is a need for a new cutting insert that is similar to a round-shaped insert in that it exhibits favorable cutting edge strength, but also is similar to a square-shaped insert in that it includes multiple cutting edges, is indexable, and also allows for a high feed rate and favorable wear properties.

SUMMARY

In order to address the foregoing needs, the present disclosure provides a cutting insert for milling operations, such as, face milling, slot milling, plunge milling, and ramping operations. The cutting insert exhibits a combination of favorable cutting edge strength, and unique cutting edge geometry, thus, allowing milling operations at relatively high feed rates. The cutting insert includes at least four convex cutting edges. Certain embodiments of square cutting inserts will have four convex cutting edges which may be connected by nose corners. The convex cutting edge may comprise at least one of a circular arc, a portion of an ellipse, a portion of a parabola, a multi-segment spline curve, a straight line, or combinations of these. Wherein the convex cutting edge comprises a circular arc, the circular arc may have a radius greater than or equal to two times a radius of the largest circle that may be inscribed on the top surface.

Embodiments of the cutting insert according to the present disclosure may be produced in the form of, for example, face milling inserts. Relative to conventional cutting inserts having linear cutting edges, embodiments of the cutting inserts according to the present invention may allow significantly increased feed rates, reduced radial cutting forces, increase rates of material removal and increased cutting insert life. Embodiments of the cutting insert may be robustly designed for use in other milling operations, such as ramping, plunging, and slotting. In addition, certain embodiments of a cutter body, disclosed herein, are designed to include insert pockets that will accept various cutting inserts with convex cutting edges.

These and other advantages will be apparent upon consideration of the following description of certain embodiments.

BRIEF DESCRIPTION OF THE FIGURES

Embodiments of the present invention will be understood by reference to the following figures, wherein.

DESCRIPTION OF EMBODIMENTS

Figure 1A:
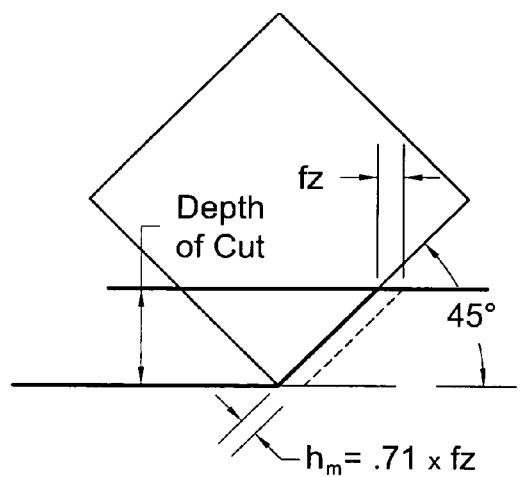
FIGS. 1(a), 1(b), and 1(c) illustrate variations in the average chip thickness for lead angles of 45°, 75°, and 90° of a substantially square-shaped cutting insert with a linear cutting edge in a typical milling operation, wherein the lead angle is measured from the direction of travel of the insert to the cutting edge of the insert.
Figure 1B:
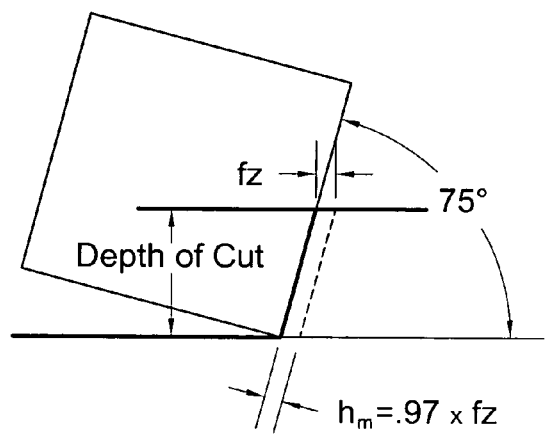
Figure 1C:
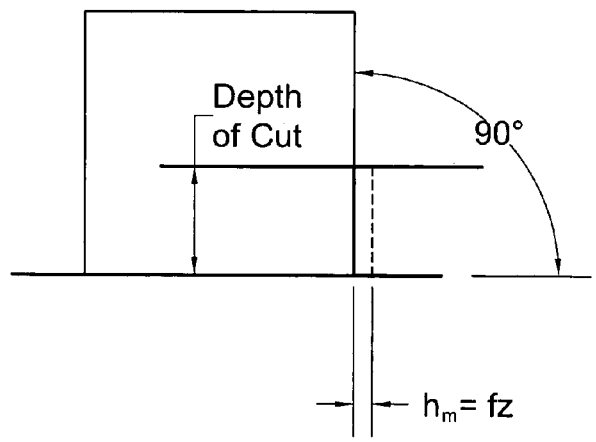
Figure 2:
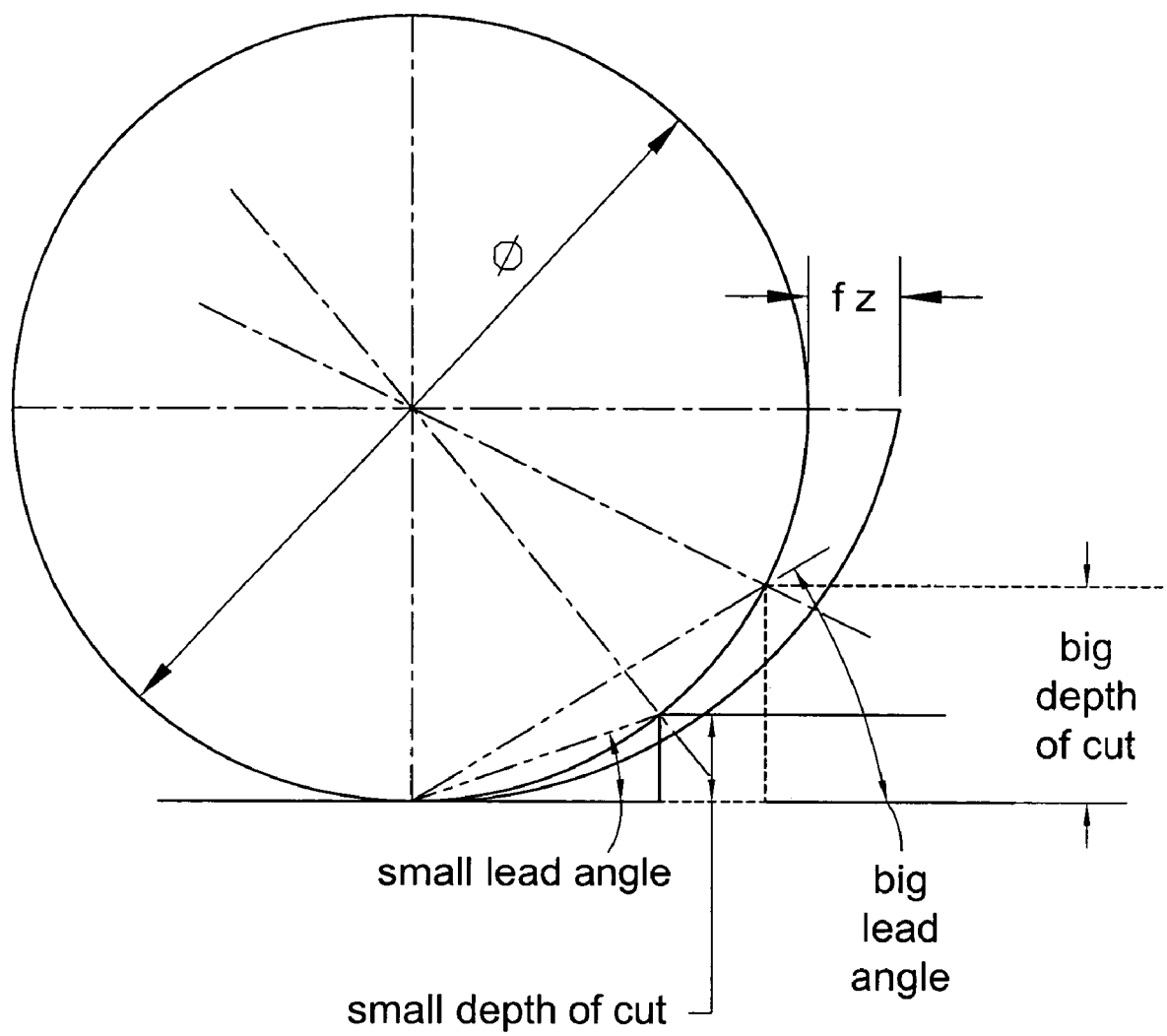
FIG. 2 illustrates variation in average lead angle for different depths of cut for application of a substantially round-shaped cutting insert in a typical milling operation.
Figure 3:
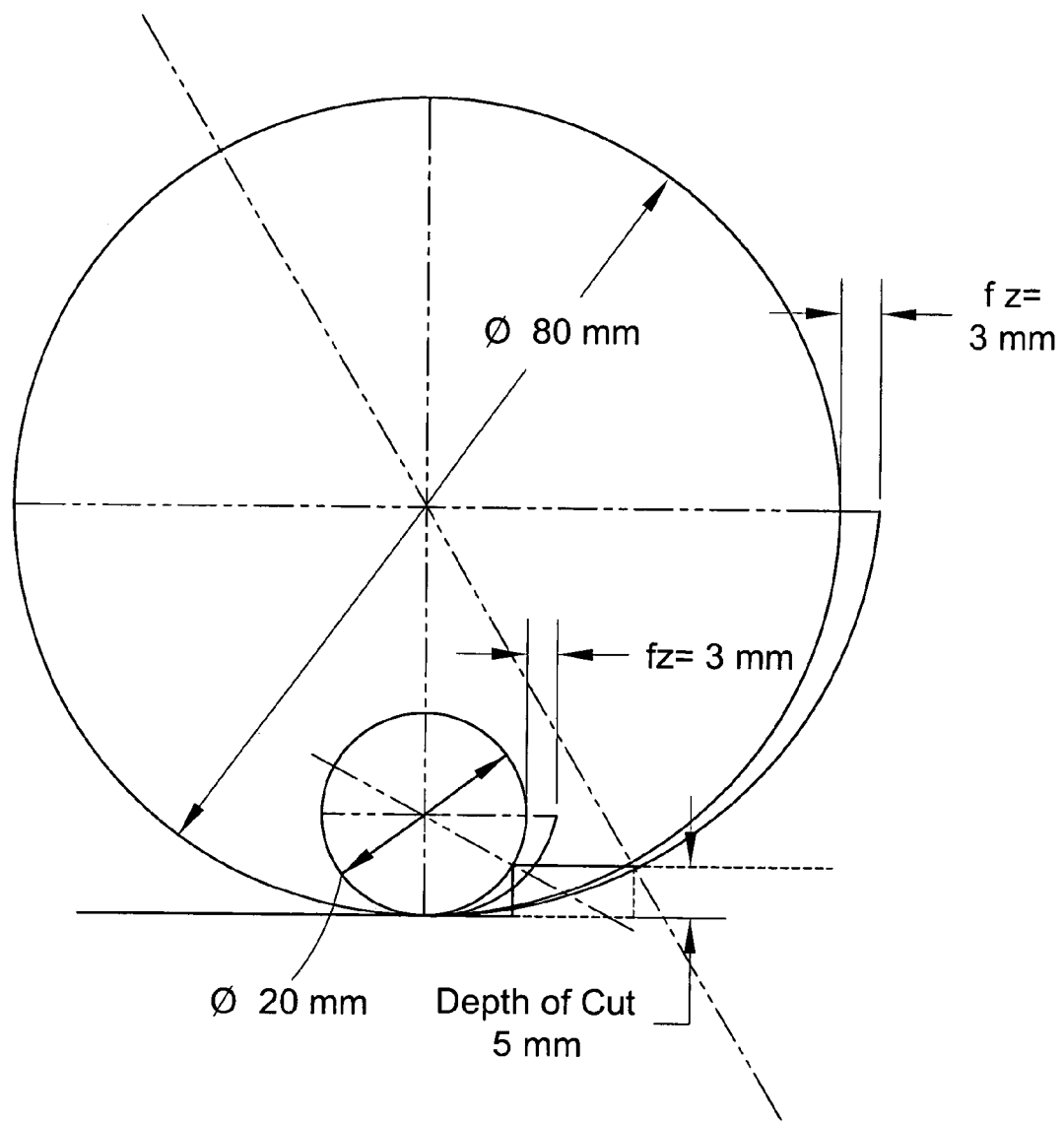
FIG. 3 illustrates the difference in the extent of engaged cutting edge between a substantially round-shaped cutting insert with an 80 mm diameter and a substantially round-shaped cutting insert with a 20 mm diameter for a milling operation with a 5 mm depth of cut.

It is to be understood that certain descriptions of the present invention herein have been simplified to illustrate only those elements and limitations that are relevant to a clear understanding of the present invention, while eliminating, for purposes of clarity, other elements. Those of ordinary skill in the art, upon considering the present description of the invention, will recognize that other elements and/or limitations may be desirable in order to implement the present invention. However, because such other elements and/or limitations may be readily ascertained by one of ordinary skill upon considering the present description of the invention, and are not necessary for a complete understanding of the present invention, a discussion of such elements and limitations is not provided herein. For example, as discussed herein, embodiments of the cutting inserts of the present disclosure may be produced in the form of face milling inserts and other inserts for materials cutting. The manners in which cutting inserts are manufactured is generally understood by those of ordinary skill in the art and, accordingly, are not described in detail herein. In addition, all the geometric shapes should be considered to be modified by the term "substantially" wherein the term "substantially" means that the shape is formed within typical design and manufacturing tolerances for cutting inserts.

Furthermore, certain embodiments of the invention according to the present disclosure are disclosed in the form of face milling cutting inserts. It will be understood, however, that the present invention may be embodied in forms and applied to end uses that are not specifically and expressly described herein. For example, one skilled in the art will appreciate that embodiments of the present invention may be manufactured as cutting inserts for other methods of removing metal from work pieces.

Certain embodiments of the present invention are directed to cutting inserts providing a combination of advantages exhibited by round-shaped cutting inserts having a very large radius, and square-shaped inserts of conventional size adapted for conventional use in a variety of machining applications. Certain other embodiments of the present invention are directed to a milling cutting tool including embodiments of unique cutting inserts of the present invention.

These features are provided by an embodiment of the present invention of a cutting insert having a relatively large cutting edge defined by a curvature radius arc. The cutting insert maintains the overall size of the insert as measured by the diameter of an inscribed circle. Additionally, embodiments of the present invention may comprise cutting inserts with the general shape of any standard cutting insert having four or more sides, such as a square, rhombus, or other cutting insert shapes. In the simplest form the convex cutting edge is in the form of an arc of a circle having a relatively large radius when compared to the radius of a circle inscribed in the top face of the insert. The arc of a circle is considered to be relatively large if the radius of the arc is greater than or equal to two times the radius of the largest circle that may be inscribed in the top surface of the cutting insert. In certain embodiments, the radius of the arc may be greater than or equal to 5 times the radius of the largest circle that may be inscribed in the top surface of the cutting insert, for certain other applications, results may be improved if radius of the arc is greater than or equal to 10 times the radius of the largest circle that may be inscribed in the top surface of the cuffing insert. The convex cutting edge has been described initially as comprising a circular arc, however, the convex cutting edge may also comprise portions of an ellipse, portions of a parabola, multi-segment line curves, straight lines, and combinations of these.

As a result, embodiments of the cutting insert of the present invention may have a convex cutting edge, such as a relatively large curvature radius on a curved cutting edge, and generate a relatively smooth cut and relatively thin chips. A cutting insert having a convex cutting edge allows a greater length of engagement for the cutting edge than a similar conventional cutting insert with a linear cutting edge for the same depth of cut. This reduces the stress per unit length of the cutting edge and may, in turn, enable the use of relatively high feed rates or longer insert life in comparison with conventional cutting inserts employed in face milling operations. The convex cutting edge may be formed on one or more cuffing edges of the cutting insert. Preferably, all the cutting surfaces have convex edges so that the tool is fully indexable.

Another advantage provided by certain embodiments of the cutting insert of the present invention draws on features of a square-shaped insert, which typically are relatively robustly designed such that the same cuffing insert can be used for plunge, slot, and ramping milling applications, in addition to high feed face milling applications. Also, a cutter body according to certain embodiments of the present invention may be designed such that the same insert pocket can receive cutting inserts of different convex cutting edges. Accordingly, embodiments of the cuffing insert of the present disclosure perform in a fashion similar to round-shaped cutting insert having a relatively large radius but are much more versatile.

Embodiments of the present invention include a generally square-shaped cutting insert with four convex cutting edges. The four cutting edges may or may not be identical. In addition, each of the convex cutting edges may include several regions. For example, a first region may include a curved cutting edge portion having a relatively large curvature radius. One or more other regions of each convex cutting edge include a substantially straight or linear cutting edge as viewed from a top portion of the cutting insert. The first region of the convex cutting edge portion of the cutting insert may form a generally conical clearance (or relief) surface on a side surface of the cutting insert. Based on combining features of a relatively large round-shaped insert and a square-shaped insert of conventional size, a method has been developed, discussed below, that may be used to guide the design of the cutting edges of certain embodiments of the cutting insert of the present invention.

Certain machining applications require a relatively positive cutting action. Therefore, a chip breaker feature may also optionally be included in embodiments of the cutting inserts of the present disclosure. A chip breaker is typically a built-in feature at the top portion of a milling cutting insert. A chip breaker often is characterized by certain basic parameters, such as groove depth, rake angle, backwall land and groove width, to provide positive cutting actions with lower cutting power in face milling operations.

Figure 4A:
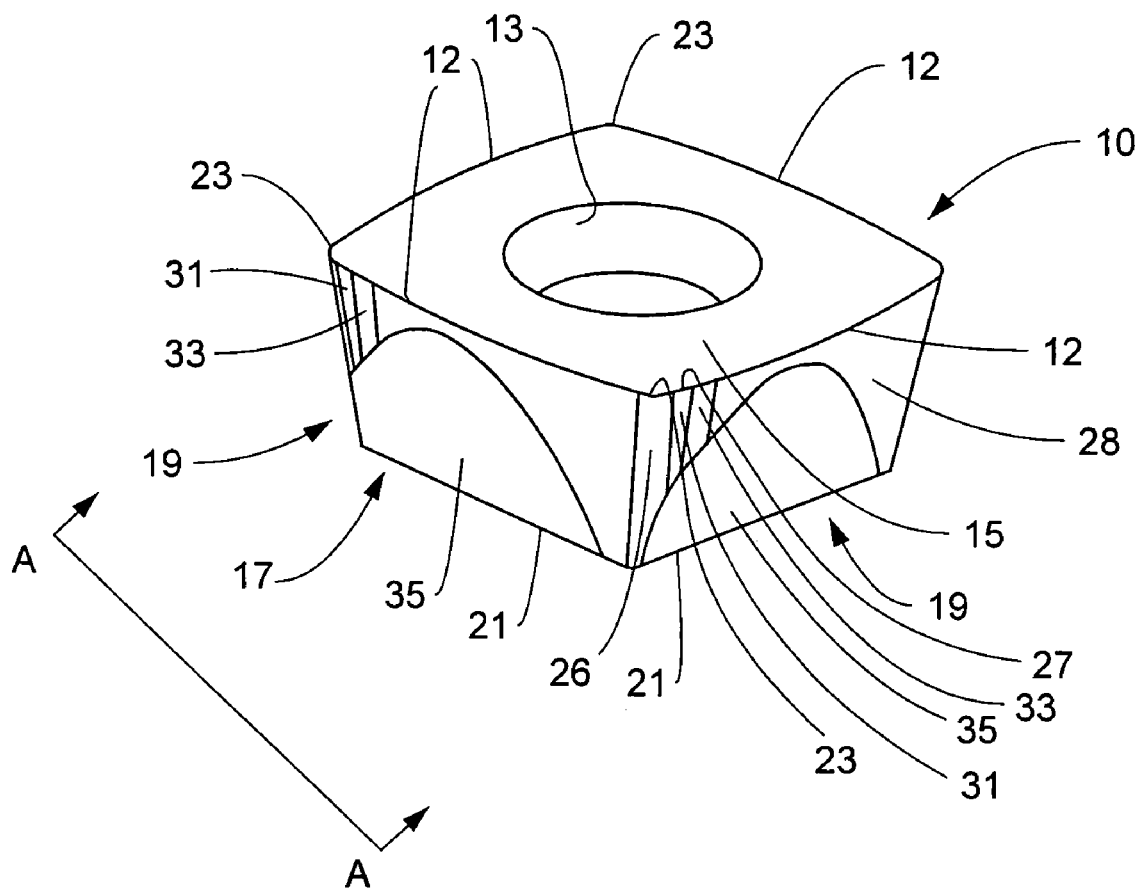
FIGS. 4(a)–(c) illustrate different views of an embodiment of a cutting insert with convex cutting edges according to the present disclosure.
Figure 4C:
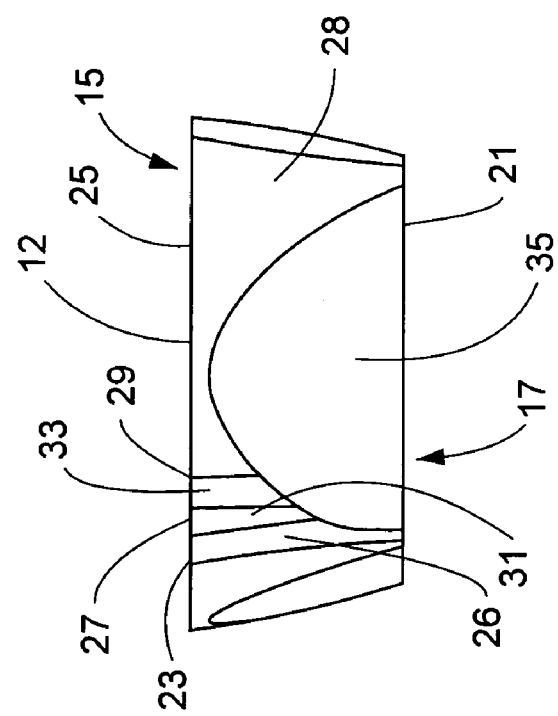
Figure 4B:
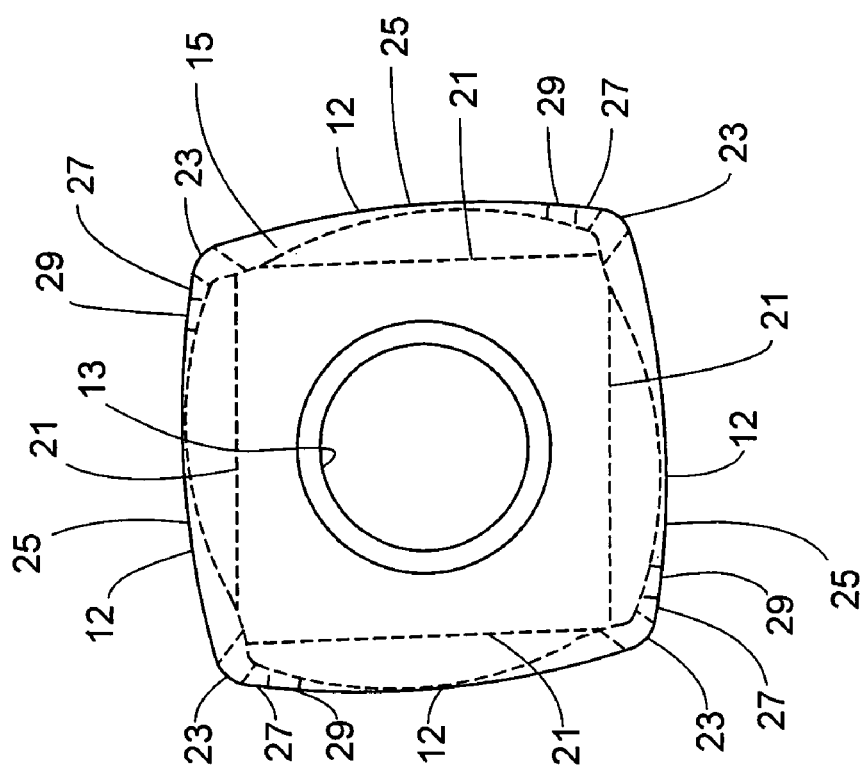

An embodiment of the cutting insert, referenced as 10, is shown in FIG. 4. The cutting insert 10 may be made of any of the various materials adapted for cutting applications. Such materials include wear resistant materials, such as steel, metal carbides, composites, such as aluminum oxide and metal carbides, tungsten carbides, ceramics, cermets as well as other materials known in the art. The material may additionally be coated to improve the properties of the cutting insert in certain applications. As shown in FIG. 4(*a*), an embodiment of the cutting insert 10 defines a central bore 13, a top face 15, a bottom face 17, and four identical cutting edges 12 formed around the periphery of the top face 15. FIG. 4(*b*) is a top view of the cutting insert 10, looking down at top surface 15, and with bottom edge 21 and the several edges formed on each side surface 19 indicated in broken lines. FIG. 4(*c*) is a side elevational view of cutting insert 10 in the direction of arrows A—A in FIG. 4(*a*). As best shown in FIGS. 4(*a*) and 4(*c*), each side surface 19 of the insert 10 includes several clearance surfaces formed between the cutting edge 12 and the bottom edge 21, formed around the periphery of the bottom face 17. In this embodiment, each of the four convex cutting edges 12 consists of several regions, including a curved cutting edge region 25 with a large curvature radius, and two substantially straight (i.e., linear) cutting edge regions 27 and 29. The four convex cutting edges 12 of cutting insert 10 are connected by nose corners 23.

Although the cutting edges 12 of cutting insert 10 include these several regions, alternate embodiments of the cutting insert of the present disclosure may include four identical cutting edges including only a nose radius and a curved cutting edge portion with a large curvature radius arc, such as cutting edge regions 23 and 25 of cutting insert 10 wherein the large curvature radius arc extends from nose corner 23 to an adjacent nose corner 23. Accordingly, such embodiments do not include one or more substantially straight (i.e., linear) cutting edge regions, as included in cutting insert 10 as regions 27 and 29.

Returning again to cutting insert 10 of FIG. 4, each of region of the cutting edge 12 of cutting insert 10 forms a distinct clearance surface on a side surface 19 of the insert 10. Each such clearance surface extends downward from the cutting edge 12 of the insert 10 to the bottom edge 21. For example, as best shown in FIGS. 4(*a*) and (*c*), conical clearance surface 26 extends downward from nose radius 23, conical clearance surface 28 extends downward from curved cutting edge 25, planar clearance surface 31 extends downward from straight cutting edge 27, and planar clearance surface 33 extends downward from straight cutting edge 29. Cutting insert 10 also includes secondary planar clearance surface 35, which extends the clearance surfaces 28, 31, and 33 to the bottom edge 21 of the insert 10.

According to the embodiment of FIG. 4, a substantially square-shaped cutting insert 10 includes four convex cutting edges 12, and the curved cutting edge region 25 of the cutting edge 12 has a relatively large curvature radius as viewed from the top surface 15 of the cutting insert 10. This large curvature radius is preferably significantly larger than the nominal radius of the insert's inscribed circle. The curved cutting edge region 25 then forms the conical clearance surface 28 on the side surface 19 of the cutting insert 10.

Figure 5A:
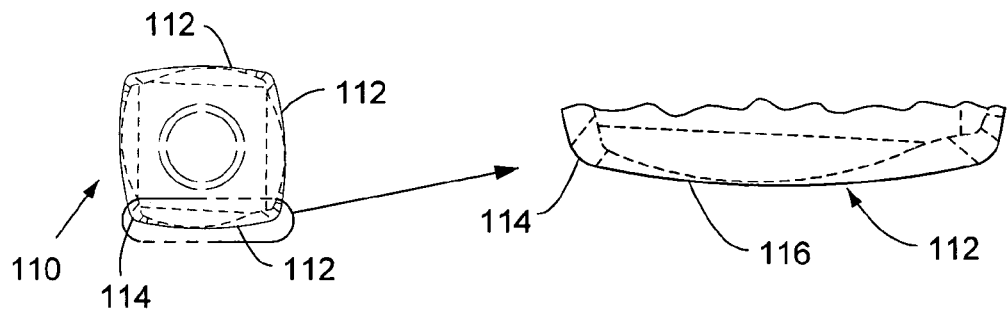
FIGS. 5(a)–(d) illustrate several possible convex cutting edge designs of cutting inserts according to the present disclosure.
Figure 5B:
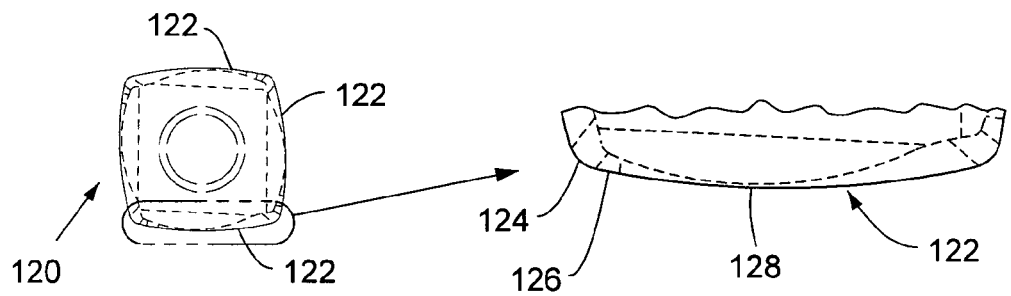
Figure 5C:
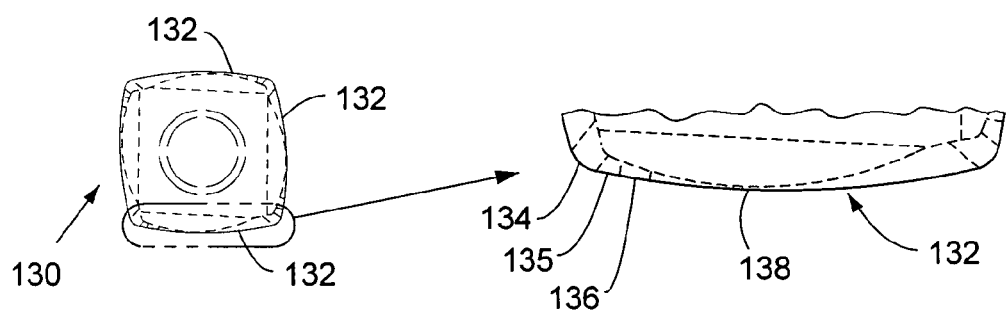
Figure 5D:
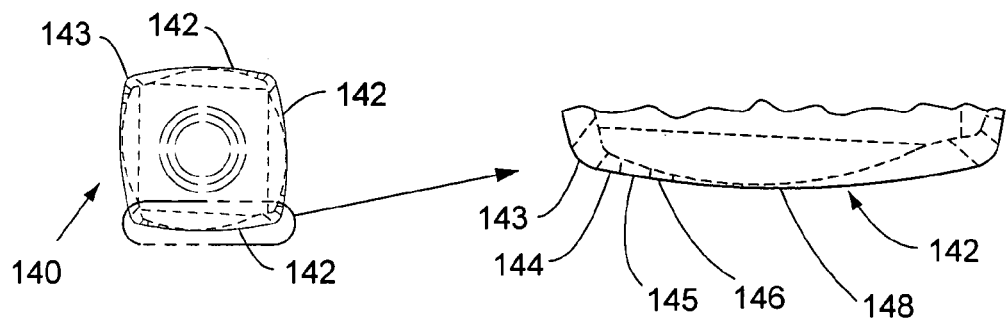

Accordingly, it will be understood that different embodiments of the cutting insert of the present disclosure may include different combinations of distinct cutting edge regions. For example, FIG. 5 illustrates various designs of the cutting edges of inserts of the present disclosure. FIG. 5(a) depicts a substantially square-shaped cutting insert 110 including four identical cutting edges 112, cutting insert 110 includes a nose radius region 114 and a convex cutting edge region 116. The cutting edges 112 of insert 110 lack linear regions. FIG. 5(b) depicts a substantially square-shaped cutting insert 120 including four identical convex cutting edges 122, cutting insert 120 includes a nose radius region 124, one substantially linear cutting edge region 126, and a curved cutting edge region 128 having a relatively large curvature radius. FIG. 5(c) depicts a substantially square-shaped cutting insert 130 including four identical cutting edges 132, cutting insert 130 includes a nose radius region 134, two adjacent substantially linear cutting edge regions 135 and 136, and a curved cutting edge region 138 having a relatively large curvature radius. FIG. 5(d) depicts a substantially square-shaped cutting insert 140 including four identical cutting edges 142, cutting insert 140 includes a nose radius region 143, three adjacent substantially linear cutting edge regions 144, 145, and 146, and a curved cutting edge region 148 having a relatively large curvature radius.

Figure 6A:
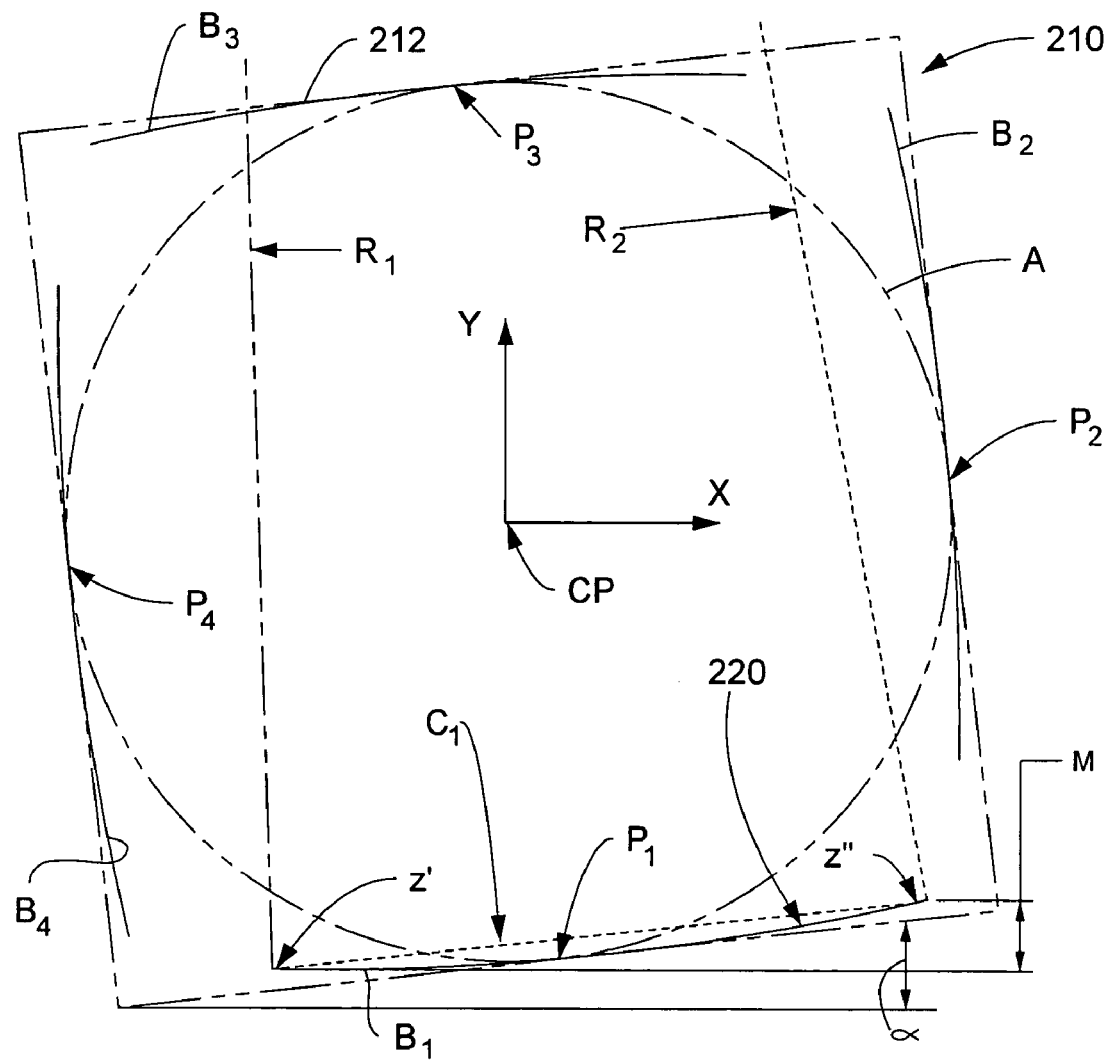
FIG. 6(a)–(d) depicts steps in the method of the present invention to prepare an embodiment of the cutting tool of the present invention comprising at least four convex cutting edges.
Figure 6D:
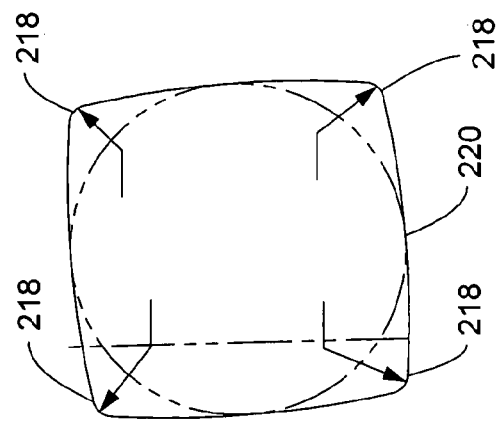
Figure 6C:
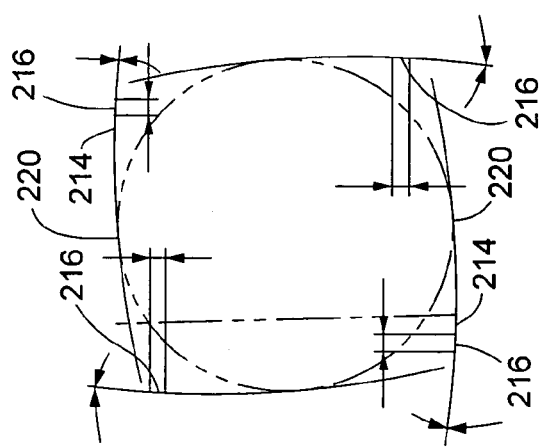
Figure 6B:
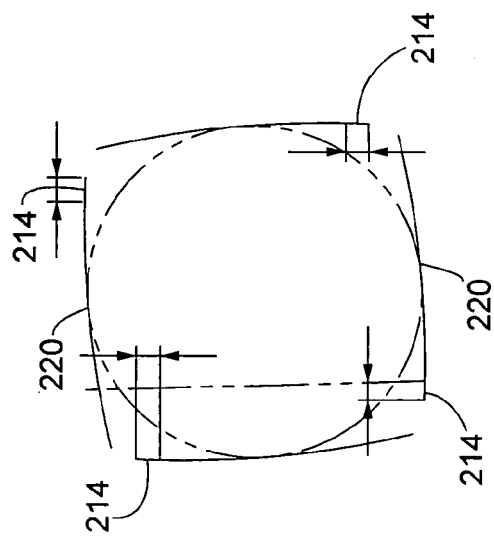

Certain embodiments of cutting inserts according to the present disclosure may be generally described mathematically. As an example, reference is made FIG. 6. As known in the art, the diameter of the inscribed circle, A, (i.e., the circle of largest radius fitting within the perimeter of the insert surface) generally represents the size of a cutting insert. With reference to FIG. 6(a), assume that the origin (i.e., point (0,0)) of Cartesian coordinate system X-Y is at the center, CP, of the inscribed circle A within the cutting insert represented by the square 210. The equation of the inscribed circle A can be described be the following equation (II):

$$x^2 + y^2 = R^2 \quad (II)$$

where R is the radius of inscribed circle A. A unique feature of certain embodiments of cutting inserts according to the present disclosure is the combination of certain advantages of a relatively large round-shaped insert and certain advantages of a square-shaped insert of conventional size. Each of the four cutting edges 212 of the substantially square-shaped insert will be tangent to the inscribed circle A at their points of contact, $P_1$, $P_2$, $P_3$, and $P_4$ which can be determined by the above equation, and can be represented by a group of tangential equations of the inscribed circle as follows:

$$P_{ix} x + P_{iy} y = R^2 \quad (III)$$

where $P_{ix}$ and $P_{iy}$ are X and Y coordinates of the tangent points and i=1, ..., 4. The square insert is set by a lead angle α, which is directly related to the maximum depth of cut M to be used when cutting with a round-shaped insert. Assume the bottom side of the square 210 in FIG. 6(a) is tangent to the inscribed circle A at the point $P_1(P_{1x}, P_{1y})$. In that case, $P_{1x} = R^*(\sin \alpha)$ and $P_{1y} = -R^*(\cos \alpha)$. By substituting the point $(P_{1x}, P_{1y})$ into the above equation, we obtain the following equation (IV) for the lower side of the square 210 in FIG. 6:

$$(\sin\alpha) \cdot x - (\cos\alpha) \cdot y = R^2 \quad (IV)$$

where α is the lead angle.

Equations defining the remaining three sides of the square 210 in FIG. 6 may be derived in a similar fashion, resulting in the following set of equations (V)–(VIII), one representing each side of the square:

$$\begin{cases} (\sin\alpha) \cdot x - (\cos\alpha) \cdot y = R^2 \\ (\cos\alpha) \cdot x + (\sin\alpha) \cdot y = R^2 \\ -(\sin\alpha) \cdot x + (\cos\alpha) \cdot y = R^2 \\ -(\cos\alpha) \cdot x - (\sin\alpha) \cdot y = R^2 \end{cases}$$

The above group of equations is based on the lead angle that corresponds to the maximal depth of cut. Each of the four cutting edges of the insert, including the curved cutting edge region having relatively large curvature radius, will be confined by square 210 formed by equations (V)–(VIII).

Once the above equations (V)–(VIII) have been generated, an arc of an identical length with a radius greater than inscribed circle A is provided on each side of square 210, tangent to square 210 at each of points $P_1$ through $P_4$. The four identically positioned arcs are shown in FIG. 6(a) as arcs $B_1$ through $B_4$. In certain embodiments of the cutting insert, a chord of each of the four arcs $B_1$–$B_4$ that is parallel to the particular adjacent side of square 210 defines the curved cutting edge region. Thus, with reference to FIG. 6(a), the arc $B_1$ has radius of curvature greater than the radius of inscribed circle A. Dotted line Z is parallel to the side of square 210 tangent to arc $B_1$ and intersects arc $B_1$ at points z' and z''. The chord $C_1$ of arc $B_1$ intermediate points z' and z'' defines the curved cutting edge region 220 of the cutting insert. The relatively large radius of curvature of the curved cutting edge region 220 is indicated by dotted line segments $R_1$ and $R_2$, which extend from curved cutting edge region 220 toward the center point of the radius of curvature defining arc $B_1$. If extended the distance of the radius of curvature of arc $B_1$, line segments $R_1$ and $R_2$ will meet at a point well beyond center point CP of circle A.

Since in this embodiment, the chord C1 of the arc B1 is parallel to the adjacent side of square 210, the defined curved cutting edge region with large curvature radius, has the same lead angle as seen in the above group of equations. In situations where the cutting insert provided in the present disclosure is to be used primarily for face milling, the tangential line at lower left end point $Z^1$ of the arc $B_1$ to be perpendicular to the cutter body axis, such that good surface finish can be insured on the machined surface that is perpendicular to the cutter body axis. Then according to the geometric relationship shown in FIG. 6, the length of the chord, $C_1$, can be represented as a function of the maximal depth of cut and the lead angle α as shown in the following equation (IX):

$$L_b = doc_{max} / \sin\alpha \quad (IX)$$

In such case, the curvature radius Rb of the curved cutting edge region is determined by the following formula:

$$R_b = \frac{L_b}{2 \cdot \sin(\theta/2)} = \frac{L_b}{2 \cdot \sin\alpha} \quad (X)$$

where θ is the arc center angle.

A second step within the design procedure of certain embodiments of cutting inserts according to the present disclosure may be to add a second region to the cutting edge, such as in this example, a linear cutting edge region that is perpendicular to the cutting insert axis and tangent to the lower left end point of the arc forming the curved cutting edge region of the cutting insert. This second step is illustrated by FIG. 6(*b*), wherein a first linear cutting edge region 214 of similar length is added to the end of each curved cutting edge region 220. The next step may be to add a second linear cutting edge region to the end of the first linear cutting edge region 214 on each cutting edge. The second linear cutting edge region 216 may be set at a relatively small angle relative to the first linear cutting edge region. This step is illustrated in FIG. 6(*c*), wherein second linear cutting edge region 216 is added on each cutting edge to the end of first linear cutting edge region 214. A further additional step may be to add nose corners to the cutting insert. In this embodiment, the nose corners 218 each have an identical radius that smoothly connects and is tangent to the second linear cutting edge region 216 and the curved cutting edge region 220 that each nose corner 218 connects. This step is illustrated in FIG. 6(*d*), wherein four identical nose corners 218 complete the cutting insert profile 220.

Once the complete convex cutting edge 214, 216, and 220 shown in FIG. 6(*d*) is defined, all the clearance surfaces (i.e., facets) on the side surfaces of the cutting insert may be formed. In the embodiment shown in FIG. 4, the conical clearance (or relief) surface 28 may be formed below the curved edge portion 25 having a large curvature radius, then connected by a planar clearance face 35 which is extended to the bottom edge 21 of the cutting insert 10. The large curvature radius on each curved cutting edge of the above-described insert is much larger than the nose radius 23 on each corner of the insert, for example, a curvature radius of 55 mm on the curved cutting edge portion of the convex cutting edge is compared to the nose radius of 0.8 mm on the insert corner. The planar facet 33 is formed below the straight edge portion 29 and the planar facet 31 is formed below the straight edge portion 27, both on each of four side surfaces of the cutting insert 10. The facet 33 functions as a cutting facet to produce machined surface perpendicular to the cutting axis while the facet 31 as an approach angle for plunge milling along the direction of cutting. And finally the conical clearance surface 26 is formed below the nose corner 23.

Figure 7:
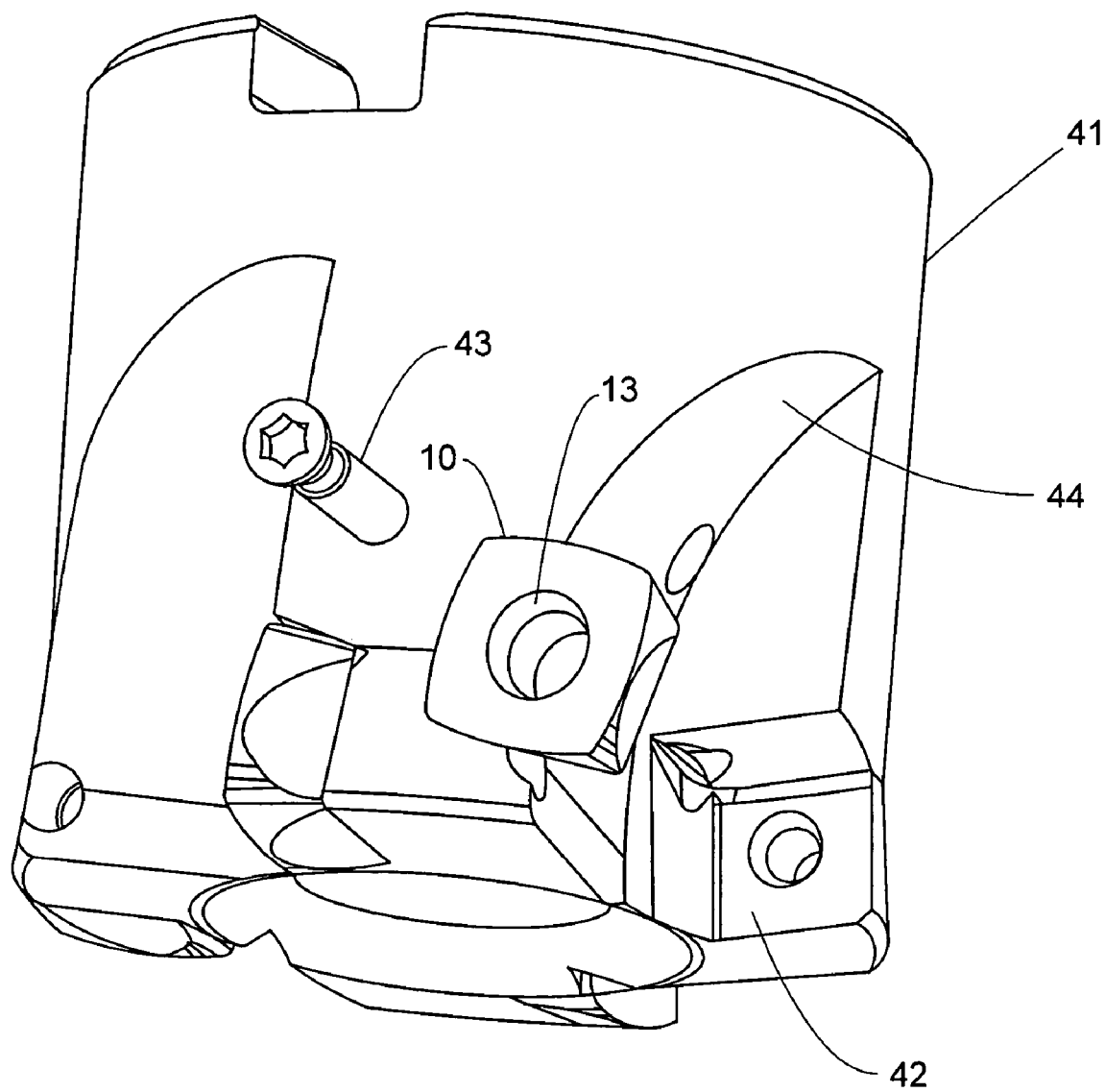
FIG. 7 is a perspective view of a milling cutter tool comprising a cutter body holding a plurality of cutting inserts.

A plurality of the cutting inserts, such as the embodiment of cutting insert 10, may be assembled into a cutting body 41 as shown in FIG. 7 and securely positioned into the pocket 42 by a screw 43 through the center hole 13 on the cutting insert 10. The cutter may also include a flute 44 that helps evacuate the chips produced during machining.

Figure 8:
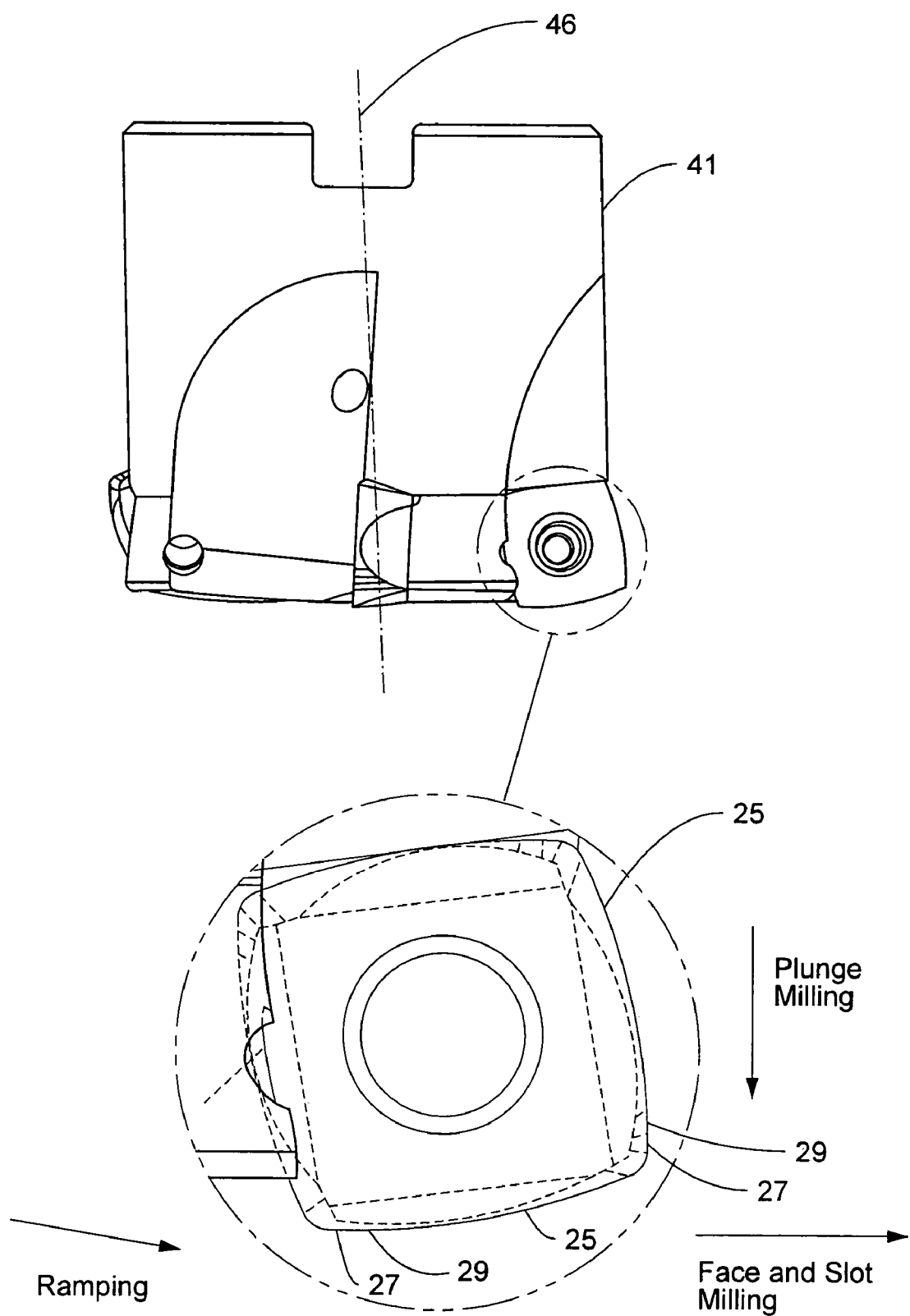
FIG. 8 includes an enlargement of one pocket of a cutter body comprising a cutting insert and depicts the relationship between the cutting edge of an embodiment of the cutting insert of the present invention and the axis of the cutter body and also depicts the linear movement of the cutting insert relative to the workpiece for face milling, plunge milling, slot milling, and ramping.
Figure 9A:
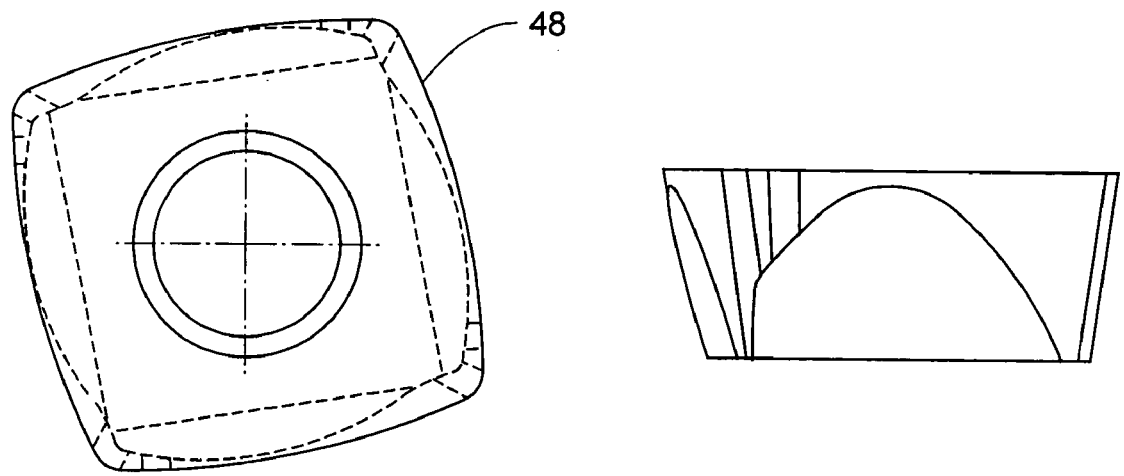
FIG. 9(a) is a top plan views and side views of an embodiment of the cutting insert of the present invention comprising a convex cutting edge partially defined by a circular arc with a radius of 22.5 mm
Figure 9B:
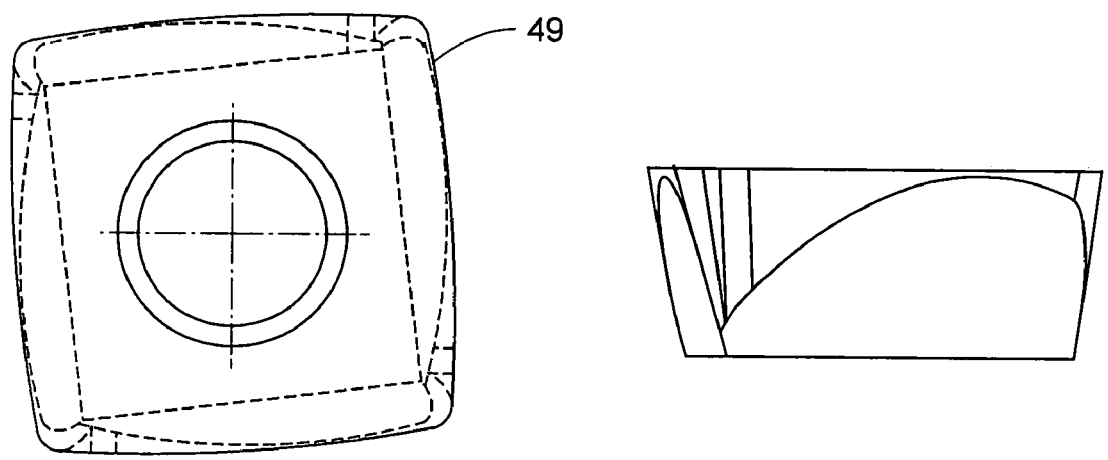
FIG. 9(b) is a top plan views and side views of an embodiment of the cutting insert of the present invention comprising a convex cutting edge partially defined by a circular arc with a radius of 55 mm.

In certain face milling applications as shown in FIG. 8, the straight cutting edge 29 may be perpendicular to the cutting axis 46 to guarantee good surface finish on the machined surface. The cutter body 41 is designed in a way that the same pocket can receive the cutting insert having same size yet different convex cutting edge, and maintain the perpendicular relationship between the straight cutting edge 29 of the insert 10 and the axis of the cutter 46. FIG. 9 shows an example of the same size cutting insert having a 12.7 mm in diameter or 6.35 mm in radius of the insert inscribed circle with two different large curvature radii on the convex cutting edge, i.e., the cutting insert 48 has a 22.5 mm radius curve as part of the convex cutting edge, and the cutting insert 49 has 55 mm radius curve as part of the convex cutting edge.

The cutter 41 as shown in FIG. 8 may also designed in a way that it allows using the same insert sitting in the same pocket to perform multiple milling functions (facing, slotting, ramping, and plunging) as already shown in FIG. 8. This means that if the cutting action follows a direction along the machined surface that is perpendicular to the cutter axis 46, the inserts are performing face or slot milling operations; and if the cutting action follows a direction that is parallel to the cutter axis 46, the cutting inserts perform a plunge milling operation; and further if the cutting action follows a small angle to the surface of the work piece to be machined as shown in FIG. 8, the cutting inserts perform a ramping operation.

Figure 10:
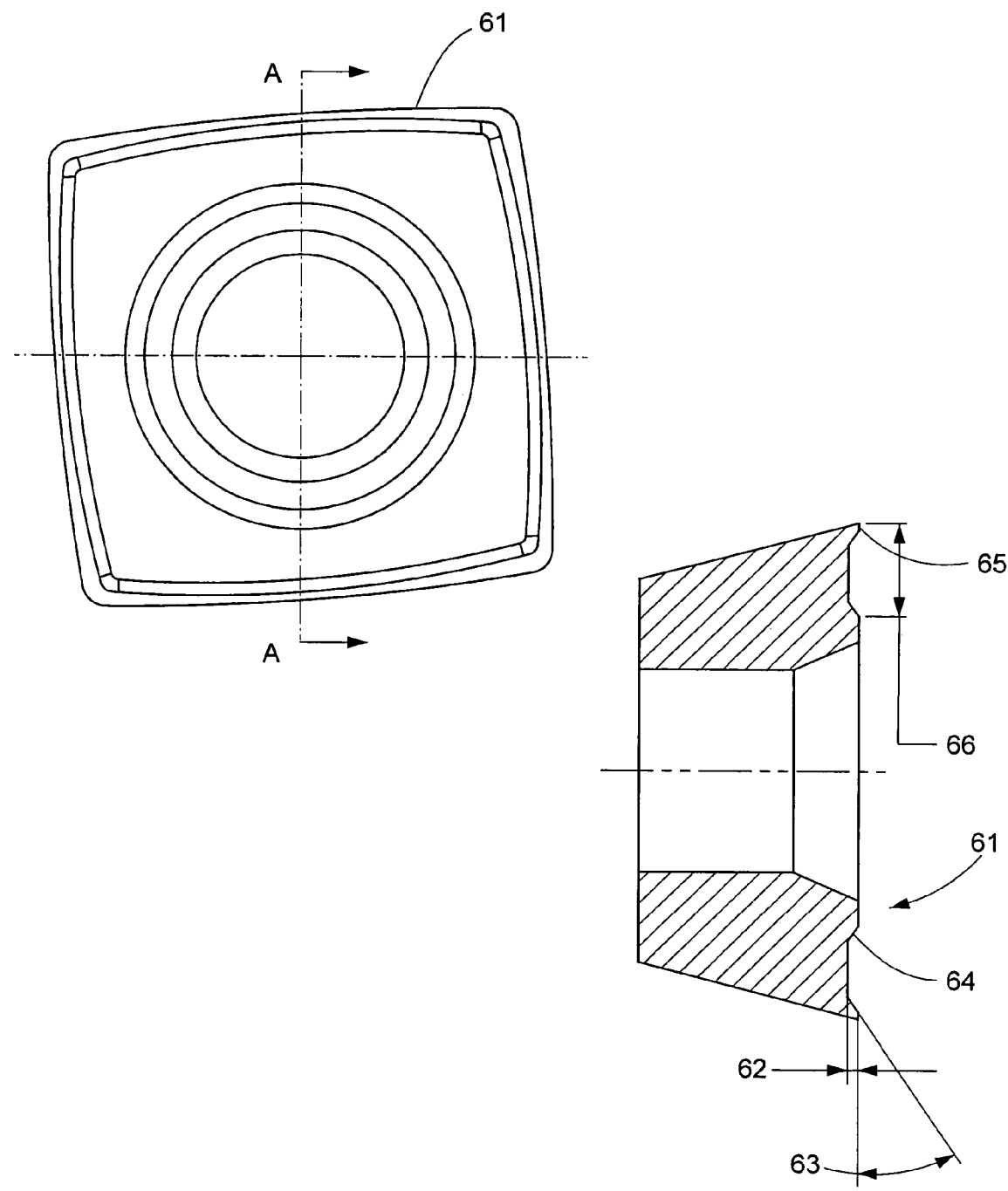
FIG. 10 is a top and side view of another embodiment of the cutting insert of the present invention comprising a chip breaking geometry on the top surface.

The cutting inserts provided in this invention are not limited to the cutting insert with a top flat surface but also to the cutting inserts with a chip breaker on the top of the insert surface. Shown in FIG. 10 is a design of the cutting insert 61 provided in this invention that has a chip breaker on the top surface 61. Such a chip breaker can be characterized by at least five basic parameters like groove depth 62, rake angle 63, backwall 64, land 65 and groove width 66 as well as other chip breaking features known in the art. The function of the chip breaker which may be built into embodiments, the cutting inserts of the present invention allows the cutting insert and the associated cutter to be adapted to use in machining a variety of work materials.

It will be understood that the present description illustrates those aspects of the invention relevant to a clear understanding of the invention. Certain aspects of the invention that would be apparent to those of ordinary skill in the art and that, therefore, would not facilitate a better understanding of the invention have not been presented in order to simplify the present description. Although embodiments of the present invention have been described, one of ordinary skill in the art will, upon considering the foregoing description, recognize that many modifications and variations of the invention may be employed. All such variations and modifications of the invention are intended to be covered by the foregoing description and the following claims.

What is claimed is:

1. A cutting insert, comprising:
    a top surface comprising at least four convex cutting edges;
    a bottom surface with a perimeter that is less than the perimeter of the top surface;
    at least one conical clearance surface adjacent to at least one of the convex cutting edges extending between the top surface and bottom surface; and
    nose corners connecting the at least four convex cutting edges, wherein the convex cutting edges comprise a circular arc with a radius greater than or equal to two times a radius of the largest circle that may be inscribed on the top surface.

2. The cutting insert of claim 1, wherein each of the nose corners comprises at least one of a circular arc, a series of circular arcs, and a multi-segment spline curve.

3. The cutting insert of claim 1, wherein at least one of the convex cutting edges comprise a circular arc with a radius greater than or equal to five times a radius of the largest circle that may be inscribed on the top surface.

4. The cutting insert of claim 1, wherein the convex cutting edges comprise a circular arc with a radius greater than or equal to ten times a radius of the largest circle that may be inscribed on the top surface.

5. The cutting insert of claim 2, wherein the convex cutting edges further comprise at least one substantially straight line.

6. The cutting insert of claim 2, wherein the convex cutting edge comprises two substantially straight lines.

7. The cutting insert of claim 2, wherein the convex cutting edge comprises three substantially straight lines.

8. The cutting insert of claim 1, wherein the convex cutting edges comprises at least one of a circular arc, a portion of an ellipse, a portion of a parabola, a multi-segment spline curve, a straight line.

9. The cutting insert of claim 1, further comprising chip breaking geometry on the top surface.

10. A cutting insert, comprising:
a top surface comprising at least four convex cutting edges, wherein the cutting edges comprise a circular arc portion and at least one straight portion;
a bottom surface with a perimeter that is less than the perimeter of the top surface;
the cutting edges are substantially parallel to the bottom surface;
at least one conical clearance surface adjacent to at least one of the convex cutting edges and extending between the top surface and the bottom surface; and nose corners connecting the at least four convex cutting edges, wherein at least one of the convex cutting edges comprise a circular arc with a radius greater than or equal to two times a radius of the largest circle that may be inscribed on the top surface.

11. The cutting insert of claim 10, wherein at least one of the convex cutting edges comprise a circular arc with a radius greater than or equal to five times a radius of the largest circle that may be inscribed on the top surface.

12. The cutting insert of claim 10, wherein the convex cutting edges comprise a circular arc with a radius greater than or equal to ten times a radius of the largest circle that may be inscribed on the top surface.

13. The cutting insert of claim 10, wherein the convex cutting edge comprises two substantially straight lines.

14. The cutting insert of claim 13, wherein the convex cutting edge comprises three substantially straight lines.

15. The cutting insert of claim 10, further comprising chip breaking geometry on the top surface.

16. The cutting insert of claim 1, wherein each clearance surface extends downward from the circular arc of each cutting edge to the bottom surface.

17. The cutting insert of claim 1, wherein the conical clearance surface extends below the entire length of the circular arc.

18. The cutting insert of claim 10, wherein each clearance surface extends downward from the circular arc of each cutting edge to the bottom surface.

19. The cutting insert of claim 10, wherein the conical clearance surface extends below the entire length of the circular arc.

* * * * *